US012087194B2

(12) United States Patent
Feng et al.

(10) Patent No.: US 12,087,194 B2
(45) Date of Patent: Sep. 10, 2024

(54) PIXEL CIRCUIT

(71) Applicant: TCL CHINA STAR OPTOELECTRONICS TECHNOLOGY CO., LTD., Guangdong (CN)

(72) Inventors: Chen Feng, Guangdong (CN); Yuelun Mai, Guangdong (CN)

(73) Assignee: TCL CHINA STAR OPTOELECTRONICS TECHNOLOGY CO., LTD., Guangdong (CN)

( * ) Notice: Subject to any disclaimer, the term of this patent is extended or adjusted under 35 U.S.C. 154(b) by 0 days.

(21) Appl. No.: 17/622,771

(22) PCT Filed: Dec. 17, 2021

(86) PCT No.: PCT/CN2021/139293

§ 371 (c)(1),
(2) Date: Dec. 24, 2021

(87) PCT Pub. No.: WO2023/103053

PCT Pub. Date: Jun. 15, 2023

(65) Prior Publication Data

US 2024/0038116 A1 Feb. 1, 2024

(30) Foreign Application Priority Data

Dec. 6, 2021 (CN) ......................... 202111477925.1

(51) Int. Cl.
*G09G 3/36* (2006.01)
*G09G 3/20* (2006.01)

(52) U.S. Cl.
CPC ............. *G09G 3/20* (2013.01); *G09G 3/3648* (2013.01); *G09G 3/3659* (2013.01); *G09G 3/3688* (2013.01); *G09G 2310/0286* (2013.01)

(58) Field of Classification Search
CPC .................. G09G 3/3648; G09G 3/36; G09G 2300/0857; G09G 2300/0842;
(Continued)

(56) References Cited

U.S. PATENT DOCUMENTS 10,311,783 B2 * 6/2019 Ma ....................... G09G 3/3275
10,991,333 B2 * 4/2021 Guo ..................... G09G 3/3688
(Continued)

FOREIGN PATENT DOCUMENTS

CN 104575438 A 4/2015
CN 105679239 A 6/2016
(Continued)

OTHER PUBLICATIONS

Chinese Office Action issued in corresponding Chinese Patent Application No. 202111477925.1 dated Jul. 26, 2023, pp. 1-6.
(Continued)

*Primary Examiner* — Xuemei Zheng
(74) *Attorney, Agent, or Firm* — PV IP PC; Wei Te Chung

(57) ABSTRACT

A pixel circuit including a switching circuit, a storage circuit, a driving circuit, and a pull-down circuit is disclosed. The switching circuit is configured for providing first and second power signals to the storage circuit according to a first gate-driving signal. The storage circuit is configured for providing a corresponding one of first and second data signals to a first node in response to one of the first and second power signals. The driving circuit is configured for writing the voltage signal of the first node into the pixel electrode according to a second gate-driving signal. The circuit structure of the pixel circuit of the present disclosure is relatively simplified. The number of transistors used is less, such that the occupied area is small, thereby facilitating realization of a high-resolution display device.

17 Claims, 2 Drawing Sheets

100

(58) Field of Classification Search
CPC ......... G09G 2310/08; G09G 2330/021; G09G 3/20; G09G 3/3659; G09G 3/3688
See application file for complete search history.

(56) References Cited

U.S. PATENT DOCUMENTS

| | | | | |
|---|---|---|---|---|
| 2012/0007901 | A1 | 1/2012 | Yen | |
| 2017/0148383 | A1 | 5/2017 | Kim | |
| 2020/0265763 | A1* | 8/2020 | Shang | G09G 3/3688 |
| 2021/0335314 | A1* | 10/2021 | Yuan | G09G 3/3648 |

FOREIGN PATENT DOCUMENTS

| | | | |
|---|---|---|---|
| CN | 106601177 | A | 4/2017 |
| CN | 106782282 | A | 5/2017 |
| CN | 108597468 | A | 9/2018 |
| CN | 109087609 | A | 12/2018 |
| CN | 113539174 | A | 10/2021 |

OTHER PUBLICATIONS

International Search Report in International application No. PCT/CN2021/139293, mailed on Aug. 25, 2022.
Written Opinion of the International Searching Authority in International application No. PCT/CN2021/139293, mailed on Aug. 25, 2022.

* cited by examiner

PIXEL CIRCUIT

FIELD OF INVENTION

The present disclosure relates to the field of display driving technology, and more particularly, to a pixel circuit.

BACKGROUND OF INVENTION

Memory in pixel (MIP) is a design of storing gray-scale signals, which control the displays of pixels, in the pixels. In the past, the pixel is designed to use the storage capacitor (CST) to maintain the voltage of the gray-scale displayed by the pixel. Even if displaying the same image, each frame is required to be refreshed. That is, the pixels are recharged. The pixel designed with MIP can store the gray-scale signal, which controls the display of the pixel, in the pixel. When the image displayed by the display device is a still image, that is, the gray scales of the pixels do not change, they are unnecessary to be refreshed. The source driving circuit can stop outputting the data signals and maintain the data voltage of the pixel electrodes by the pixel circuits, so as to reduce the power consumption of the display device.

For the display device using the existing MIP technology, the pixel circuit thereof uses a phase-locked loop to store the data voltage of the pixel electrode. However, the structure of the phase-locked loop is complex. A large number of transistors are included therein, so that a large area is occupied, which is disadvantageous to realization of high-resolution display device.

SUMMARY OF INVENTION

Technical Problem

A pixel circuit is disclosed in the present disclosure to solve the problem that the structure of the existing pixel circuit is complex to occupy a large area.

Technical Solutions

In order to solve the aforementioned problem, one aspect of the present disclosure is to provide a pixel circuit including a switching circuit, a storage circuit, a driving circuit, and a pull-down circuit. The switching circuit is configured for receiving a first gate-driving signal, a first power signal, and a second power signal. The storage circuit is connected with the switching circuit and configured for receiving a first data signal and a second data signal. The driving circuit is connected with the storage circuit at a first node, and is connected with a pixel electrode. The pull-down circuit is connected with the first node and configured for pulling down a voltage signal of the first node to a low voltage level according to a control signal. The switching circuit is configured for providing the first power signal and the second power signal to the storage circuit according to the first gate-driving signal. The storage circuit is configured for providing a corresponding one of the first data signal and the second data signal to the first node in response to one of the first power signal and the second power signal, and the driving circuit is configured for writing the voltage signal of the first node into the pixel electrode according to a second gate-driving signal.

In some embodiment, the pull-down circuit is configured for pulling down the voltage signal of the first node to a voltage level of a low voltage signal according to the control signal in response to that the voltage signal of the first node is switched from the first data signal to the second data signal or from the second data signal to the first data signal.

In some embodiment, the switching circuit includes a first transistor and a second transistor. A gate terminal of the first transistor receives the first gate-driving signal, a first terminal of the first transistor receives the first power signal, and a second terminal of the first transistor is connected with the storage circuit. A gate terminal of the second transistor receives the first gate-driving signal, a first terminal of the second transistor receives the second power signal, and a second terminal of the second transistor is connected with the storage circuit.

In some embodiment, the storage circuit includes a third transistor and a fourth transistor. A gate terminal of the third transistor is connected with the switching circuit, a first terminal of the third transistor receives the first data signal, and a second terminal of the third transistor is connected with the first node. A gate terminal of the fourth transistor is connected with the switching circuit, a first terminal of the fourth transistor receives the second data signal, and a second terminal of the fourth transistor is connected with the first node.

In some embodiment, the third transistor and the fourth transistor are floating-gate transistors.

In some embodiment, the driving circuit includes a fifth transistor. A gate terminal of the fifth transistor receives the second gate-driving signal, a first terminal of the fifth transistor is connected with the first node, and a second terminal of the fifth transistor is connected with the pixel electrode.

In some embodiment, the pull-down circuit includes a sixth transistor. A gate terminal of the sixth transistor receives the control signal, a first terminal of the sixth transistor is connected with the first node, and a second terminal of the sixth transistor receives a low voltage signal.

In some embodiment, a voltage level of one of the first power signal and the second power signal is in a first numerical range, and a voltage level of the other of the first power signal and the second power signal is in a second numerical range, wherein the first numerical range does not overlap with the second numerical range.

In some embodiment, the storage circuit receives the first data signal and the second data signal through a first data line and a second data line, respectively. One of the first data line and the second data line is connected with a first pulse signal terminal and a source-driving circuit, and the other of the first data line and the second data line is connected with a second pulse signal terminal. The first pulse signal terminal and the second pulse signal terminal are both configured for outputting pulse data signals, and the source-driving circuit is configured for outputting a display data signal.

In some embodiment, in a low-frequency operation mode, the first data signal and the second data signal are the pulse data signals; in a normal operation mode, the data signal outputted by one of the first data line and the second data line is the display data signal.

Beneficial Effect

In the pixel circuit disclosed in the embodiments of the present disclosure, the storage circuit selectively provides the first data signal or the second data signal to the first node under the control of the first power signal and the second power signal, wherein the first data signal or the second data signal may be a pulse data signal or a display data signal according to different modes. Therefore, when the source driving circuit stops outputting the data signal, the data voltage of the pixel electrode can still be maintained. Compared with the existing phase-locked loop, the circuit structure of the pixel circuit in the present disclosure is relatively simplified. The number of transistors used is less, such that the occupied area is small, thereby facilitating realization of a high-resolution display device. Moreover, by the pull-down circuit of the pixel circuit, the data voltage distortion caused by interference can be avoided when the first data signal is switched to the second data signal (or when the second data signal is switched to the first data signal).

DESCRIPTION OF DRAWINGS

The technical solutions and other beneficial effects of the present disclosure are obvious by describing the specific embodiments of the present disclosure in combination with the accompanying drawings in detail.

DETAILED DESCRIPTION OF PREFERRED EMBODIMENTS

The technical solutions in the embodiments of the present disclosure are clearly and completely described below in combination with the accompanying drawings in the embodiments of the present disclosure. Obviously, the described embodiments are only a part of the embodiments of the present disclosure rather than all of the embodiments. Based on the embodiments in the present disclosure, all other embodiments obtained by a person of ordinary skill in the art without creative efforts fall within the claim scope of the present disclosure.

Figure 1:
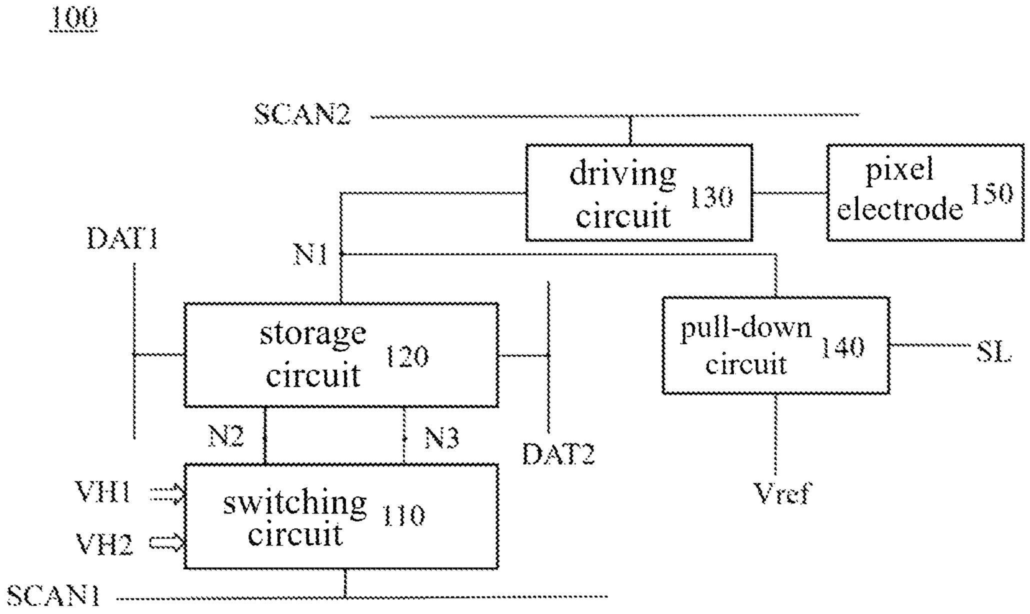
FIG. 1 illustrates a block diagram of a pixel circuit according to some embodiments of the present disclosure.

FIG. 1 illustrates a block diagram of a pixel circuit according to some embodiments of the present disclosure. As shown in FIG. 1, the pixel circuit 100 includes a switching circuit 110, a storage circuit 120, a driving circuit 130, and a pull-down circuit 140. The switching circuit 110 is connected with a first scan line SCAN1, a first power signal line VH1, and a second power signal line VH2, and is configured to receive a first gate-driving signal, a first power signal, and a second power signal through the first scan line SCAN1, the first power signal line VH1, and the second power signal line VH2, respectively. The storage circuit 120 is connected with a first data line DAT1 and a second data line data2, and is configured to receive the first data signal and the second data signal through the first data line data1 and the second data line DAT2, respectively. The storage circuit 120 is further connected with the driving circuit 130 and the pull-down circuit 140 at a first node N1, and is further connected with the switching circuit 110 at a second node N2 and a third node N3. The driving circuit 130 is connected to the second scan line SCAN2 and a pixel electrode 150, and is configured to receive a second gate-driving signal through the second scan line SCAN2. The switching circuit 110 is configured to provide the first power signal and the second power signal to the storage circuit 120 according to the first gate-driving signal. The storage circuit 120 is configured to provide a corresponding one of the first data signal and the second data signal to the first node N1 in response to one of the first power signal and the second power signal. The driving circuit is configured to write the voltage signal of the first node N1 into the pixel electrode 150 according to the second gate-driving signal. The pull-down circuit 140 is configured to pull down the voltage of the first node N1 to a low voltage level according to a control signal SL.

It can be understood that the pixel circuit 100 of the present disclosure can be applied to each pixel unit in the display panel of the display device. That is, each pixel unit of the display panel can include the pixel circuit 100 as shown in FIG. 1. It can be further understood that for the pixel unit of the display panel, the pixel circuits in the plurality of pixel units in the same row are connected with the same two scan lines, and the pixel circuits in the plurality of pixel units in the same column are connected with the same two data lines and two power signal lines.

Specifically, when the first gate-driving signal is at a first voltage level (e.g., a high voltage level) and the second gate-driving signal is at a second voltage level (e.g., a low voltage level), the switching circuit 110 is enabled by the first gate-driving signal and inputs the first power signal and the second power signal into the second node N2 and the third node N3. The storage circuit 120 is configured to conduct the first data line DAT1 to the first node N1 in response to the voltage signal of the second node N2, and to provide the first data signal to the first node N1. Alternatively, the storage circuit 120 is configured to conduct the second data line DAT2 to the first node N1 in response to the voltage signal of the third node N3, and to provide the second data signal to the first node N1. At this time, the driving circuit 130 is disabled by the second gate-driving signal.

Next, when the first gate-driving signal is at a second voltage level (e.g., a low voltage level) and the second gate-driving signal is at a first voltage level (e.g., a high voltage level), the switching circuit 110 is disabled by the first gate-driving signal. The driving circuit 130 is enabled by the second gate-driving signal, and writes the voltage signal of the first node N1 (i.e., a corresponding one of the first data signal and the second data signal) into the pixel electrode 150 to perform the operation of displaying image.

In some embodiments, one of the first data line DAT1 and the second data line DAT2 is connected with a first pulse signal terminal and a source driving circuit, and the other of the first data line DAT1 and the second data line DAT2 is connected with a second pulse signal terminal. Both the first pulse signal terminal and the second pulse signal terminal are configured to output pulse data signals, and the source driving circuit is configured to output a display data signal.

In some embodiments, the operation modes of the pixel circuit may include at least a low-frequency operation mode and a normal operation mode. In the normal operation mode (e.g., the refresh frequency is 60 Hz), the source driving circuit is in a working state and normally outputs the display data signals. When the image displayed by the display device is a still image, the display device can activate the low-frequency operation mode (the refresh frequency may be 30 Hz or even lower). In the low-frequency operation mode, the source driving circuit stops working (disable), and no display data signal is outputted during the disabled period.

In the low-frequency operation mode, the first data signal may be a pulse signal provided by one of the first pulse signal terminal and the second pulse signal terminal. The second data signal may be a pulse signal provided by the other of the first pulse signal terminal and the second pulse signal terminal. In some embodiments, the first pulse signal may be, for example, a normally-white signal, and the second pulse signal may be, for example, a normally-black signal.

In the normal operation mode, the data signal outputted by one of the first data line DAT1 and the second data line DAT2 is the display data signal provided by the source driving circuit. Furthermore, in the normal operation mode, the transistor connected to the data line which is connected to the source driving circuit remains in a conductive state, while the other transistor remains in a cut-off state, so as to ensure that the display data signal can be normally written into the pixel electrode 150.

Since one of the first data line DAT1 and the second data line DAT2 is connected with both the pulse signal terminal and the source driving circuit, said data line can output different data signals in different operation modes, so that time division multiplexing can be realized and the wiring costs of the display device are reduced.

In some embodiments, the voltage level of one of the first power signal and the second power signal is in a first numerical range, and the voltage level of the other of the first power signal and the second power signal is in a second numerical range, wherein the first numerical range and the second numerical range are not overlapped. Specifically, the voltage level of the first power signal is complementary to the voltage level of the second power signal. Therefore, the storage circuit 120 can provide the first data signal and the second data signal to the first node N1 alternatively according to the first power signal and the second power signal, so that the first data line and the second data line can continuously provide the data signal to the first node N1. Since the first data line DAT1 and the second data line DAT2 are connected to the first pulse signal terminal and the second pulse signal terminal, respectively, the data voltage of the pixel electrode can still be maintained when the source driving circuit stops outputting the data signal.

Since the voltage signal of the first node N1 is provided by the first data signal and the second data signal alternatively, the pixel circuit 100 further includes a pull-down circuit 140 in some embodiments of the present disclosure in order to avoid distortion of data voltage caused by the interference of one of the first and second data signals on the other thereof on the first node N1 when the first data signal is switched to the second data signal (or when the second data signal is switched to the first data signal). The pull-down circuit 140 is configured to pull down the voltage signal of the first node N1 to a voltage level of a low voltage level signal according to the control signal SL in response to that the voltage signal of the first node N1 is switched from one of the first data signal and the second data signal to the other of the first data signal and the second data signal (i.e., when the voltage signal of the first node N1 is switched from the first data signal to the second data signal or from the second data signal to the first data signal).

Specifically, when the first power signal is switched from the first numerical range to the second numerical range, the second power signal is switched from the second numerical range to the first numerical range. At this time, the first data signal provided to the first node N1 by the storage circuit 120 is replaced by the second data signal. Alternatively, when the second power signal is switched from the first numerical range to the second numerical range, the first power signal is switched from the second numerical range to the first numerical range. At this time, the second data signal provided to the first node N1 by the storage circuit 120 is replaced by the first data signal. Therefore, when the voltage level of the first power signal or the second power signal is switched, the pull-down circuit 140 can be enabled by the control signal SL to pull down the voltage signal of the first node N1 to a low voltage level. In this way, when the voltage signal of the first node N1 is switched, the voltage signal of the first node N1 is pulled down to a low voltage level by the pull-down circuit 140, so that the voltage signal on the first node N1 may not be distorted due to the signal superposition when providing another data signal.

Figure 2:
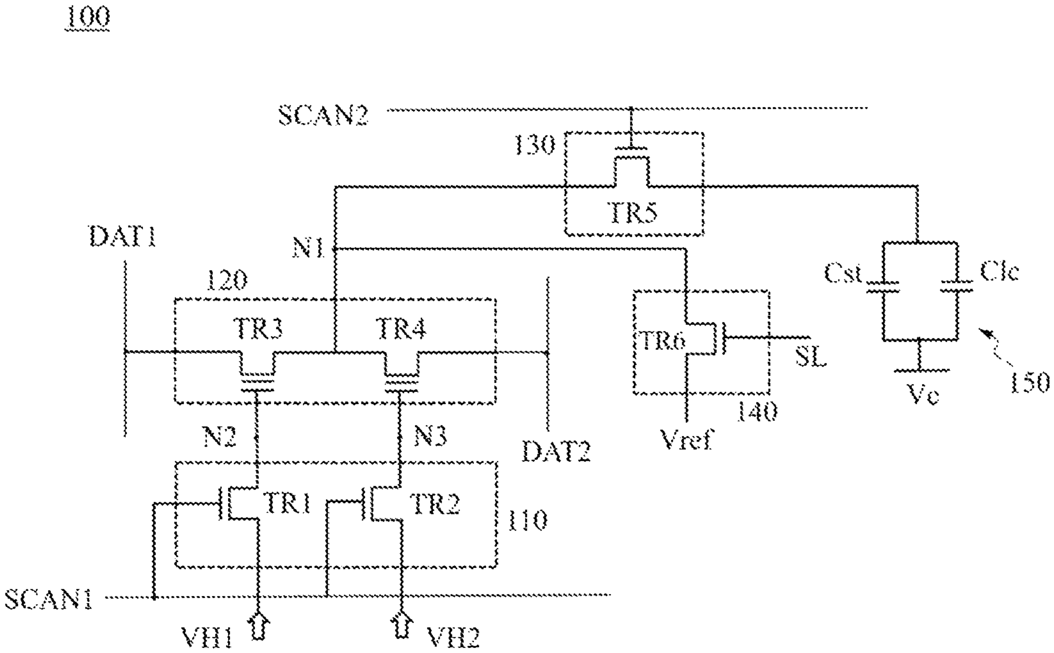
FIG. 2 illustrates a circuit structure diagram of a pixel circuit according to some embodiments of the present disclosure.

Reference is made to FIG. 2. FIG. 2 illustrates a circuit structure diagram of a pixel circuit 100 according to some embodiments of the present disclosure. In some embodiments, the switching circuit 110 includes a first transistor TR1 and a second transistor TR2. The gate terminal of the first transistor TR1 is connected to the first scan line SCAN1 for receiving the first gate-driving signal, the first terminal of the first transistor TR1 is connected to the first power line VH1 for receiving the first power signal, and the second terminal of the first transistor TR1 is connected to the storage circuit 120. The gate terminal of the second transistor TR2 is connected to the first scan line SCAN1 for receiving the first gate-driving signal, the first terminal of the second transistor TR2 is connected to the second power line VH2 for receiving the second power signal, and the second terminal of the second transistor TR2 is connected to the storage circuit 120.

In some embodiments, the storage circuit 120 includes a third transistor TR3 and a fourth transistor TR4. The gate terminal of the third transistor TR3 is connected to the switching circuit 110 at the second node N2, the first terminal of the third transistor TR3 is connected to the first data line DAT1 for receiving the first data signal, and the second terminal of the third transistor TR3 is connected to the driving circuit 130 at the first node N1. The gate terminal of the fourth transistor TR4 is connected to the switching circuit 110 at the third node N3, the first terminal of the fourth transistor TR4 is connected to the second data line DAT2 for receiving the second data signal, and the second terminal of the fourth transistor TR4 is connected to the first node N1.

In some embodiments, the driving circuit 130 includes a fifth transistor TR5. The gate terminal of the fifth transistor TR5 is connected to the second scan line SCAN2 for receiving the second gate-driving signal, the first terminal of the fifth transistor TR5 is connected to the first node N1, and the second terminal of the fifth transistor TR5 is connected to the pixel electrode 150.

In some embodiments, the pull-down circuit 140 includes a sixth transistor TR6. The gate terminal of the sixth transistor TR6 receives the control signal SL, the first terminal of the sixth transistor TR6 is connected to the first node N1, and the second terminal of the sixth transistor TR6 is connected to a low voltage level reference signal terminal Vref for receiving the low voltage level signal.

In some embodiments, in response to that the voltage signal of the first node N1 is switched from one of the first data signal and the second data signal to the other of the first data signal and the second data signal (i.e., when the first power signal or the second power signal is switched from the first numerical range to the second numerical range or from the second numerical range to the first numerical range), the control signal SL can conduct the sixth transistor TR6, so that the first node N1 is connected to the low voltage level reference signal terminal Vref through the conducted sixth transistor TR6, thereby pulling down the voltage level of the first node N1 to the voltage level of the low voltage level signal.

In the embodiments of the present disclosure, the first transistor TR1, the second transistor TR2, the fifth transistor TR5, and the sixth transistor TR6 may be thin-film transistors, field effect transistors, or other devices with the same characteristics. According to their role in the circuit, the transistors used in the embodiments of the present disclosure are mainly switching transistors.

In some embodiments, the third transistor TR3 and the fourth transistor TR4 are floating-gate transistors. The floating-gate transistor is provided with two gate terminals, one of which is called a control gate, which has electrical connection; the other of which is located between the control gate and a transistor channel, which is surrounded by an insulating layer without connection to external wirings. Since it is floating, it is called a floating gate. The control gate controls the amount of electronic transition from the substrate to the floating gate with high voltage (or low voltage) to adjust the threshold voltage of the transistor, so as to change the external characteristics of the floating-gate transistor.

As previously described, in some embodiments of the present disclosure, the voltage level of one of the first power signal and the second power signal is in the first numerical range, and the voltage level of the other of the first power signal and the second power signal is in the second numerical range, wherein the first numerical range do not overlap with the second numerical range. That is, the first power signal and the second power signal are switched between the first numerical range and the second numerical range alternatively. For example, the first numerical range may be −30V to −20V, and the second numerical range may be 20V to 30V.

Since both the third transistor TR3 and the fourth transistor TR4 are floating-gate transistors, when the voltage level of the second node N2 is in the first numerical range and the voltage level of the third node N3 is in the second numerical range, the threshold voltage of the third transistor TR3 is shifted negatively so that the third transistor TR3 is conducted. Moreover, the threshold voltage of the fourth transistor TR4 is shifted positively, so as to maintain in the cut-off state. At this time, the first data line DAT1 is connected to the first node N1 through the conducted third transistor TR3, so as to input the first data signal to the first node N1. Furthermore, when the voltage signal loaded on the second node N2 is removed, the third transistor TR3 can remain in the conducted state. If the third transistor TR3 intends to be cut off, the threshold voltage of the third transistor TR3 is shifted positively and remains in the cut-off state as long as the voltage level of the second node N2 is set in the second numerical range.

Similarly, if the voltage level of the second node N3 is in the first numerical range and the voltage level of the third node N2 is in the second numerical range, the threshold voltage of the fourth transistor TR4 is shifted negatively so that the fourth transistor TR4 is conducted. Moreover, the threshold voltage of the third transistor TR3 is shifted positively, so as to maintain in the cut-off state. At this time, the second data line DAT2 is connected to the first node N1 through the conducted fourth transistor TR4, so as to input the second data signal to the first node N1. Similarly, when the voltage signal loaded on the second node N3 is removed, the fourth transistor TR3 can remain in the conducted state. If the fourth transistor TR4 intends to be cut off, the threshold voltage of the fourth transistor TR4 is shifted positively and remains in the cut-off state as long as the voltage level of the third node N3 is set in the second numerical range.

In the pixel circuit disclosed in the embodiments of the present disclosure, the storage circuit selectively provides the first data signal or the second data signal to the first node under the control of the first power signal and the second power signal, wherein the first data signal or the second data signal may be a pulse data signal or a display data signal according to different modes. Therefore, when the source driving circuit stops outputting the data signal, the data voltage of the pixel electrode can still be maintained. Compared with the existing phase-locked loop, the circuit structure of the pixel circuit in the present disclosure is relatively simplified. The number of transistors used is less, such that the occupied area is small, thereby facilitating realization of a high-resolution display device. Moreover, by the pull-down circuit of the pixel circuit, the data voltage distortion caused by interference can be avoided when the first data signal is switched to the second data signal (or when the second data signal is switched to the first data signal).

The technical features in the aforementioned embodiments may be randomly combined. For concise description, not all possible combinations of the technical features in the embodiment are described. However, the combinations of the technical features should all be considered as falling within the scope described in this specification provided that they do not conflict with each other.

The aforementioned embodiments only show several implementations of this application and are described in detail, but they should not be construed as a limit to the patent scope of this application. It should be noted that, a person of ordinary skill in the art may make various changes and improvements without departing from the ideas of this application, which shall all fall within the protection scope of this application. Therefore, the protection scope of the patent of this application shall be subject to the appended claims.

What is claimed is:

1. A pixel circuit, comprising:

a switching circuit configured for receiving a first gate-driving signal, a first power signal, and a second power signal;

a storage circuit connected with the switching circuit and configured for receiving a first data signal and a second data signal;

a driving circuit connected with the storage circuit at a first node, and connected with a pixel electrode; and a pull-down circuit connected with the first node and configured for pulling down a voltage signal of the first node to a low voltage level according to a control signal;

wherein the switching circuit is configured for providing the first power signal and the second power signal to the storage circuit according to the first gate-driving signal, the storage circuit is configured for providing a corresponding one of the first data signal and the second data signal to the first node in response to one of the first power signal and the second power signal, and the driving circuit is configured for writing the voltage signal of the first node into the pixel electrode according to a second gate-driving signal, wherein the pull-down circuit comprises:

a sixth transistor, wherein a gate terminal of the sixth transistor receives the control signal, a first terminal of the sixth transistor is connected with the first node, and a second terminal of the sixth transistor receives a low voltage signal.

2. The pixel circuit according to claim 1, wherein the pull-down circuit is configured for pulling down the voltage signal of the first node to a voltage level of a low voltage signal according to the control signal in response to that the voltage signal of the first node is switched from the first data signal to the second data signal or from the second data signal to the first data signal.

3. The pixel circuit according to claim 1, wherein the switching circuit comprises:

a first transistor, wherein a gate terminal of the first transistor receives the first gate-driving signal, a first terminal of the first transistor receives the first power signal, and a second terminal of the first transistor is connected with the storage circuit; and a second transistor, wherein a gate terminal of the second transistor receives the first gate-driving signal, a first terminal of the second transistor receives the second power signal, and a second terminal of the second transistor is connected with the storage circuit.

4. The pixel circuit according to claim 1, wherein the storage circuit comprises:

a third transistor, wherein a gate terminal of the third transistor is connected with the switching circuit, a first terminal of the third transistor receives the first data signal, and a second terminal of the third transistor is connected with the first node; and a fourth transistor, wherein a gate terminal of the fourth transistor is connected with the switching circuit, a first terminal of the fourth transistor receives the second data signal, and a second terminal of the fourth transistor is connected with the first node.

5. The pixel circuit according to claim 4, wherein the third transistor and the fourth transistor are floating-gate transistors.

6. The pixel circuit according to claim 1, wherein the driving circuit comprises:

a fifth transistor, wherein a gate terminal of the fifth transistor receives the second gate-driving signal, a first terminal of the fifth transistor is connected with the first node, and a second terminal of the fifth transistor is connected with the pixel electrode.

7. The pixel circuit according to claim 1, wherein a voltage level of one of the first power signal and the second power signal is in a first numerical range, and a voltage level of the other of the first power signal and the second power signal is in a second numerical range, wherein the first numerical range does not overlap with the second numerical range.

8. The pixel circuit according to claim 1, wherein the storage circuit receives the first data signal and the second data signal through a first data line and a second data line, respectively, wherein one of the first data line and the second data line is connected with a first pulse signal terminal and a source-driving circuit, and the other of the first data line and the second data line is connected with a second pulse signal terminal, wherein the first pulse signal terminal and the second pulse signal terminal are both configured for outputting pulse data signals, and the source-driving circuit is configured for outputting a display data signal.

9. The pixel circuit according to claim 8, wherein in a low-frequency operation mode, the first data signal and the second data signal are the pulse data signals; in a normal operation mode, the data signal outputted by one of the first data line and the second data line is the display data signal.

10. A pixel circuit, comprising:

a switching circuit configured for receiving a first gate-driving signal, a first power signal, and a second power signal;

a storage circuit connected with the switching circuit and configured for receiving a first data signal and a second data signal;

a driving circuit connected with the storage circuit at a first node, and connected with a pixel electrode; and a pull-down circuit connected with the first node;

wherein the switching circuit is configured for providing the first power signal and the second power signal to the storage circuit according to the first gate-driving signal, the storage circuit is configured for providing a corresponding one of the first data signal and the second data signal to the first node in response to one of the first power signal and the second power signal, and the driving circuit is configured for writing the voltage signal of the first node into the pixel electrode according to a second gate-driving signal;

wherein a voltage level of one of the first power signal and the second power signal is in a first numerical range, and a voltage level of the other of the first power signal and the second power signal is in a second numerical range, wherein the first numerical range does not overlap with the second numerical range;

wherein the pull-down circuit is configured for pulling down the voltage signal of the first node to a voltage level of a low voltage signal according to the control signal in response to that the voltage signal of the first node is switched from the first data signal to the second data signal or from the second data signal to the first data signal, wherein the pull-down circuit comprises:

a sixth transistor, wherein a gate terminal of the sixth transistor receives the control signal, a first terminal of the sixth transistor is connected with the first node, and a second terminal of the sixth transistor receives a low voltage signal.

11. The pixel circuit according to claim 10, wherein the storage circuit receives the first data signal and the second data signal through a first data line and a second data line, respectively, wherein one of the first data line and the second data line is connected with a first pulse signal terminal and a source-driving circuit, and the other of the first data line and the second data line is connected with a second pulse signal terminal, wherein the first pulse signal terminal and the second pulse signal terminal are both configured for outputting pulse data signals, and the source-driving circuit is configured for outputting a display data signal.

12. The pixel circuit according to claim 11, wherein in a low-frequency operation mode, the first data signal and the second data signal are the pulse data signals; in a normal operation mode, the data signal outputted by one of the first data line and the second data line is the display data signal.

13. A pixel circuit, comprising:

a switching circuit comprising a first transistor, wherein a gate terminal of the first transistor receives the first gate-driving signal, and a first terminal of the first transistor receives the first power signal; and a second transistor, wherein a gate terminal of the second transistor receives the first gate-driving signal, and a first terminal of the second transistor receives the second power signal;

a storage circuit comprising a third transistor, wherein a gate terminal of the third transistor is connected with a second terminal of the first transistor, a first terminal of the third transistor receives a first data signal, and a second terminal of the third transistor is connected with a first node; and a fourth transistor, wherein a gate terminal of the fourth transistor is connected with a second terminal of the second transistor, a first terminal of the fourth transistor receives the second data signal, and a second terminal of the fourth transistor is connected with the first node;

a driving circuit connected with the first node and a pixel electrode; and a pull-down circuit connected with the first node and configured for pulling down a voltage signal of the first node to a low voltage level according to a control signal;

wherein the switching circuit is configured for providing the first power signal and the second power signal to the storage circuit according to the first gate-driving signal, the storage circuit is configured for providing a corresponding one of the first data signal and the second data signal to the first node in response to one of the first power signal and the second power signal, and the driving circuit is configured for writing the voltage signal of the first node into the pixel electrode according to a second gate-driving signal, wherein the pull-down circuit comprises:

a sixth transistor, wherein a gate terminal of the sixth transistor receives the control signal, a first terminal of the sixth transistor is connected with the first node, and a second terminal of the sixth transistor receives a low voltage signal.

14. The pixel circuit according to claim 13, wherein the pull-down circuit is configured for pulling down the voltage signal of the first node to a voltage level of a low voltage signal according to the control signal in response to that the voltage signal of the first node is switched from the first data signal to the second data signal or from the second data signal to the first data signal.

15. The pixel circuit according to claim 13, wherein the third transistor and the fourth transistor are floating-gate transistors.

16. The pixel circuit according to claim 13, wherein the driving circuit comprises:

a fifth transistor, wherein a gate terminal of the fifth transistor receives the second gate-driving signal, a first terminal of the fifth transistor is connected with the first node, and a second terminal of the fifth transistor is connected with the pixel electrode.

17. The pixel circuit according to claim 13, wherein a voltage level of one of the first power signal and the second power signal is in a first numerical range, and a voltage level of the other of the first power signal and the second power signal is in a second numerical range, wherein the first numerical range does not overlap with the second numerical range.

* * * * *